(12) United States Patent
Powell et al.

(10) Patent No.: US 6,903,163 B2
(45) Date of Patent: Jun. 7, 2005

(54) HIGH MELT SWELL POLYMER

(75) Inventors: Richard James Powell, Orange, TX (US); Richard T. Chou, Hockessin, DE (US); George W. Prejean, Orange, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/246,910

(22) Filed: Sep. 19, 2002

(65) Prior Publication Data

US 2003/0060570 A1 Mar. 27, 2003

Related U.S. Application Data

(62) Division of application No. 09/629,918, filed on Jul. 28, 2000, now Pat. No. 6,518,365.
(60) Provisional application No. 60/146,060, filed on Jul. 28, 1999.

(51) Int. Cl.[7] .................................................. C08F 8/42
(52) U.S. Cl. ................... 525/274; 525/301; 525/330.2; 525/336; 525/367; 525/370; 525/371
(58) Field of Search ............................... 525/301, 274, 525/330.2, 366, 367, 370, 371

(56) References Cited

U.S. PATENT DOCUMENTS

| | | | |
|---|---|---|---|
| 3,264,272 A | | 8/1966 | Rees |
| 3,520,861 A | | 7/1970 | Thomson et al. |
| 3,862,266 A | * | 1/1975 | McConnell et al. ........ 525/301 |
| 3,900,442 A | * | 8/1975 | Zannucci et al. ............ 524/91 |
| 3,997,487 A | | 12/1976 | Rees et al. |
| 4,222,914 A | | 9/1980 | Makowski et al. |
| 4,351,931 A | | 9/1982 | Armitage |
| 4,810,755 A | * | 3/1989 | Akazawa et al. ........... 525/285 |
| 4,990,574 A | | 2/1991 | Yamada |
| 5,028,674 A | | 7/1991 | Hatch et al. |
| 5,179,160 A | * | 1/1993 | Orikasa et al. ............... 525/66 |
| 5,229,022 A | * | 7/1993 | Song et al. .................. 508/241 |
| 5,277,833 A | * | 1/1994 | Song et al. .................. 508/241 |
| 5,981,665 A | * | 11/1999 | Vestberg et al. ............ 525/243 |

FOREIGN PATENT DOCUMENTS

| | | |
|---|---|---|
| EP | 0054761 | 6/1982 |
| EP | 0148632 | 7/1985 |
| EP | 0529102 | 3/1993 |
| EP | 0615982 | 9/1994 |
| GB | 2309971 | 8/1997 |
| JP | 03-092340 | 4/1991 |

OTHER PUBLICATIONS

PCT International Search Report for International applicaton No. PCT/US00/21007 dated Nov. 16, 2000.

* cited by examiner

*Primary Examiner*—Bernard Lipman

(57) ABSTRACT

The present invention relates to high melt swell partially neutralized alpha olefin acid copolymers. It also relates to a process for making such high melt swell polymers as well as for covalently crosslinking other polar copolymers including non-neutralized acid copolymers and non-polar alpha olefin polymers by using a minor amount of metal acrylate, particularly sodium or zinc acrylate.

11 Claims, No Drawings

HIGH MELT SWELL POLYMER

CROSS REFERENCE TO RELATED APPLICATIONS

This application is a divisional of U.S. patent application Ser. No. 09/629,918, filed Jul. 28, 2000, now U.S. Pat. No. 6,518,365 which claims the benefit of U.S. Provisional Application No. 60/146,060, filed Jul. 28, 1999, both of which are incorporated by reference herein for all purposes as if fully set forth.

BACKGROUND OF THE INVENTION

1. Field of the Invention

The present invention relates to polymeric compositions, particularly partially neutralized acid copolymers with enhanced melt swell and, thus, improved processing characteristics. It also relates to a process for covalently crosslinking polar and non-polar alpha olefin polymers employing metal acrylates.

2. Description of Related Art

Ionomers (metal salts of acid copolymers) are prepared by methods well known in the art (see U.S. Pat. No. 3,264,272 (Rees) which is hereby incorporated by reference). Likewise, acid copolymers on which the ionomers are based are prepared by methods well known in the art (see U.S. Pat. No. 4,351,931, which is also incorporated by reference).

The acid copolymers typically used are direct acid copolymers. By "direct copolymer", it is meant that the copolymer is made by polymerization of monomers together at the same time, as distinct from a "graft copolymer" where a monomer is attached or polymerized onto an existing polymer chain. They typically are alpha olefin, particularly ethylene/$C_{3-8}$ $\alpha,\beta$ ethylenically unsaturated carboxylic acid, particularly acrylic and methacrylic acid, copolymers. They may also contain a third softening monomer such as an alkyl acrylate or methacrylate. The ethylene acid copolymers can be described as an E/X/Y copolymers where E is ethylene, X is the $\alpha,\beta$ ethylenically unsaturated carboxylic acid, particularly acrylic and methacrylic acid, and Y is a softening comonomer such as acrylate or methacrylate ester.

Ionomers are produced by reacting an ion source with the acid copolymers. Typical ion sources include sodium hydroxide, sodium carbonate, zinc oxide, zinc acetate, magnesium hydroxide, and lithium hydroxide. Other ion sources are well known. In addition to the preferred sodium, zinc, magnesium and lithium cations, other alkali metal or alkaline earth metal cations are useful. Such other cations include potassium, calcium, barium, lead, and tin.

This ionic crosslinking produces a thermoplastic polymer that does not exhibit appreciable increase in the elastic component of flow and, therefore, produces a thermoplastic resin with low melt swell. Processing characteristics are thus adversely effected. By increasing melt swell, ionomers with improved Theological characteristics at a given viscosity useful in extrusion coating, blown film and molding applications could be made.

BRIEF SUMMARY OF THE INVENTION

It has now been discovered that, by including minor amounts (preferably about 0.05 to about 10 weight percent (wt. %) of the polymer being modified) of certain metal acrylates, particularly zinc acrylate and sodium acrylate, in a high temperature melt of ionomers, covalent crosslinks are formed and melt swell is significantly increased. Resulting high melt swell polymers are ones that exhibit melt swells at least 10 percent higher to as much as 100, 200, 300, or 400 percent higher than a similar melt index polymer which has not been exposed in the melt to a metal acrylate. This is particularly surprising in light of the finding that metal methacrylates similar to the metal acrylates do not form covalent crosslinks and do not increase melt swell. Also, metal acetates, propionates, benzoates and the like do not form covalent crosslinks and do not increase melt swell. It has also been found that the metal acrylate salt, not the acrylic acid itself, does the crosslinking.

Including minor amounts of metal acrylate in a high temperature polymer melt can be accomplished in a number of ways. The metal acrylate may be made in situ or added to the polymer. Examples of possible processes are: 1) acrylic acid may be added to an ionomer melt, thus making the metal acrylate in situ; 2) a non-acrylate ion source such as sodium hydroxide or zinc acetate may be added to a polyethylene or an acid copolymer melt that contains acrylic acid monomer, thus making the metal acrylate in situ; and 3) metal acrylates such as sodium acrylate and zinc acrylate may be melt mixed with the polymer to be crosslinked.

It has also been found that polar alpha olefin copolymers including non-neutralized copolymers functionalized by $C_{3-8}$ $\alpha,\beta$ ethylenically unsaturated carboxylic acid (acid copolymers) and non-polar alpha olefin polymers can be covalently crosslinked to significantly decrease melt index by the method discovered. Polar alpha olefin copolymers other than acid copolymers include polymers such as ethylene acrylate copolymers and ethylene acetate coploymers. Non-polar alpha olefin polymers include polymers such as polyethylene (particularly low density polyethylene and linear low density polyethylene). It has been found that these polymers can be covalently crosslinked by the method discovered, resulting in at least a 10 percent to several fold (up to 100, 200, 300 or more percent) decrease in Melt Index.

When crosslinking polymers in which the metal acrylates are not soluble (wherein solubility is too low to achieve the minimum level of metal acrylate required by the invention), sufficient acrylic acid which is soluble must be melt blended with the polymer followed by addition of sufficient cation source to produce the desired level of metal acrylate in situ. Non-polar polyolefins and non-acid polar alpha olefin polymers are examples of polymers in which the metal acrylates are not soluble. Order is not important with ionomers and other acid copolymers because the metal salts are soluable and will react with the polymer.

Thus, the present invention is a high melt swell polymer consisting essentially of a partially neutralized alpha olefin copolymer having polar functionality provided by $C_{3-8}$ $\alpha,\beta$ ethylenically unsaturated carboxylic acid. Preferably the alpha olefin copolymer is an ethylene copolymer, particularly a partially neutralized ethylene/$C_{3-8}$ $\alpha,\beta$ ethylenically unsaturated carboxylic acid copolymer, and a minor amount of metal acrylate, particularly sodium or zinc acrylate. Preferably, about 0.05 to about 10 wt. %, more preferably about 0.1 to about 2 wt. %, and most preferably about 0.2 to about 0.8 wt. % metal acrylate is melt blended with the ethylene polymer (wt. % based on weight of ethylene polymer).

It also is a process for covalently crosslinking all alpha olefin polymers, with the proviso that in the case of non-polar alpha olefin polymers and polar alpha olefin copolymers other than acid copolymers, the metal acrylate is made in situ. The in situ process consists essentially of melt blending sufficient acrylic acid with the alpha olefin polymer and then adding a sufficient amount of a non-acrylate source of metal ion to convert the acrylic acid into about 0.05 parts to about 10 parts by weight of a metal salt of acrylic acid with 100 parts by weight of the alpha olefin polymer.

DETAILED DESCRIPTION

Various terms used in this disclosure are defined as follows:

1. "Copolymer" means polymers containing two or more monomers. The terms "bipolymer" and "terpolymer" mean polymers containing only two and three monomers respectively. The phrase "copolymer of various monomers" means a copolymer whose units are derived from the various monomers.
2. "(Meth) acrylic acid" means acrylic acid and methacrylic acid, and the term "(meth) acrylate" means acrylate and methacrylate.
3. "Consisting essentially of" means that the recited components are essential, while smaller amounts of other components may be present to the extent that they do not detract from the operability of the present invention.

It has been discovered that, by including minor amounts of certain metal acrylates in a high temperature melt of polar alpha olefin copolymers, particularly alpha olefin/$C_{3-8}$ $\alpha,\beta$ ethylenically unsaturated carboxylic acid copolymers (acid copolymers) or ionomers thereof, covalent crosslinks are formed and melt swell is significantly increased and/or melt index is significantly decreased (the metal acrylates, the acid copolymers and ionomers made from the acid copolymers are as discussed below). Particularly in the case of ionomers of acid copolymers, melt swell is significantly increased. Preferably, the metal acrylate in the melt blend is present at a concentration of about 0.05 to about 10, preferably about 0.1 to about 2, more preferably about 0.2 to about 0.8 parts by weight per hundred parts of the polymer into which the metal acrylate is melt blended.

The high melt swell polymers that result from the addition of the minor amounts of metal acrylates are ones that exhibit melt swells at least 10 percent higher to as much as 100, 200, 300 or 400 percent higher than a similar melt index polymer which has not been exposed in the melt to a metal acrylate.

By adding minor amounts of the certain metal acrylates discussed below, it has been found that any alpha olefin polymer can be crosslinked resulting in significant reductions in melt index of such polymers. In the case of alpha olefin polymers in which the metal acylates are not soluble, however, the metal acylate must be made in situ. That is to say, unlike in the case of acid copolymers and ionomers where the metal salts are soluble and will react, the metal salts are not soluble to the extent needed to get the minimum incorporation and will not react with the non-polar polymers and certain polar copolymers that are not acid copolymers. Due to this insolubility, the metal acrylate must be formed in situ when crosslinking non-polar polymers such as polyethylene and polar copolymers such as ethyl (meth)acrylates and ethyl acetates. Since acrylic acid is soluble at low levels in these polymers, a sufficient amount of acrylic acid can be melt blended with the polymer so that when a sufficient amount of a non-acrylate source of metal ion is then added, the preferred levels of metal acrylate (about 0.05 to about 10, preferably about 0.1 to about 2, more preferably about 0.2 to about 0.8 parts by weight per hundred parts of the polymer) are formed in situ. By doing so, decreases in the melt index of the alpha olefin polymer of 10 percent or more up to several fold (100, 200, 300 percent or more) are possible.

Acid Copolymer and Ionomer

The acid copolymers are preferably 'direct' acid copolymers. They are preferably alpha olefin, particularly ethylene/$C_{3-8}$ $\alpha,\beta$ ethylenically unsaturated carboxylic acid, particularly acrylic and methacrylic acid, copolymers. They may optionally contain a third softening monomer. By "softening", it is meant that the polymer is made less crystalline. Suitable "softening" comonomers are monomers selected from alkyl acrylate, and alkyl methacrylate, wherein the alkyl groups have from 1–12 carbon atoms.

The ethylene acid copolymers can be described as an E/X/Y copolymers where E is ethylene, X is the $\alpha,\beta$ ethylenically unsaturated carboxylic acid, and Y is a softening comonomer. X is preferably present in 3–30 (preferably 5–25, alternatively 8–20) wt. % of the polymer, and Y is preferably present in 0–30 (alternatively 3–25 or 10–23) wt. % of the polymer.

The ethylene-acid copolymers with high levels of acid (X) are difficult to prepare in continuous polymerizers because of monomer-polymer phase separation. This difficulty can be avoided however by use of "cosolvent technology" as described in U.S. Pat. No. 5,028,674 which is also incorporated herein by reference or by employing somewhat higher pressures than those at which copolymers with lower acid can be prepared.

Specific acid-copolymers include ethylene/(meth) acrylic acid bipolymers. They also include ethylene/(meth) acrylic acid/n-butyl (meth) acrylate, ethylene/(meth) acrylic acid/iso-butyl (meth) acrylate, ethylene/ (meth) acrylic acid/methyl (meth) acrylate, and ethylene/ (meth) acrylic acid/ethyl (meth) acrylate terpolymers.

The ionomers include partially neutralized acid copolymers, particularly ethylene/(meth)acrylic acid copolymers. Preferably, about 1 (alternatively about 3 or about 5) to about 90%, preferably about 5 to about 80% (preferably at least 10%, alternatively at least 15% or at least about 30%) of the acid moiety of the acid copolymer is neutralized by an alkali metal or an alkaline earth metal cation. Such cations are lithium*, sodium*, potassium, magnesium*, calcium, barium, lead, tin, or zinc* (*=preferred), or a combination of such cations.

Polyethylene

Alpha olefin polymers of the present invention preferably are ethylene homo- and co-polymers. The polyethylene preferably is any polyethylene that can benefit from reduced melt index to improve processability such as extrusion coating neck-in, blown film bubble stability or increased shrinkage from orientation memory. It can be selected from low density polyethylene (LDPE), linear low density polyethylene (LLDPE), or high density polyethylene (HDPE). It may be made by any available process known for making such polyethylene including high pressure gas, low pressure gas, solution and slurry processes employing conventional Ziegler-Natta, metallocene, and late transition metal complex catalyst systems. Polyethylene resins most likely to benefit are LLDPE resins produced with coordination catalysts or metallocene catalysts.

Metal Acrylates

The metal acrylates are unsaturated salts of acrylic acid introduced into the blend of the invention in non-polymeric form. Preferred metal acrylates useful in making the high melt-swell polymers are sodium and zinc salts of acrylic acid (sodium acrylate and zinc acrylate).

The metal acrylates can be made in situ with the polymers or they can be separately manufactured and melt blended with the polymers. Melt blending the metal acrylate with the polymer works especially well with ethylene/acid copolymers because of mutual solubility. Processes in which the metal acrylate is made in situ include:

1. adding acrylic acid to an ionomer melt, and
2. Adding a non-acrylate ion source such as sodium hydroxide or aqueous zinc acetate solution to a polyethylene or an ethylene copolymer melt containing acrylic acid monomer.

Melt mixing in the above processes can be carried out in medium to high intensity mixing equipment such as single and twin screw extruders, banbury mixers, or roll mills. It is also possible to obtain both ionic and covalent crosslinking in the transfer line between the high and low pressure polymer separators in a conventional ethylene acid copolymer process. The melt mixing can be accomplished in the pelletizing extruder associated with a conventional process. It is also possible to carry out the direct or in situ addition of the metal acrylate in the reactor during polymerization.

Tests Used in the Examples

Melt Index (MI)

Melt Index (MI) was measured in accord with ASTM D-1238, condition E, at 190° C., using a 2160 gram weight, with values of MI reported in grams/10 minutes. Melt index is a measure of the ability of the molten polymer to flow. MI is inversely related to viscosity and generally, for a given type of polymer, the higher the MI, the lower the molecular weight.

Melt Swell

Melt Swell is the percentage increase in strand diameter over the orifice diameter of a melt indexer used in measuring MI measured in the solid state. Values of Melt Swell are reported in percent (%). It has alternatively been defined (e.g. in U.S. Pat. No. 3,520,861 which is incorporated herein by reference) as the Plastic Recovery Value (PR %) determined on the extruded rod which emerges for the orifice during measurement of MI. The average diameter of the extruded rod is measured and the PR % is calculated from the following formula:

$$PR\ \% = \frac{D - D_o}{D_o} \times 100$$

where D is the average diameter of the extruded rod and $D_o$ is the diameter of the orifice in the melt indexer (ASTM standard orifice size is 0.0825±0.0002 inches).

Draw

An extrusion coating line was operated at a speed (revolutions per minute, RPM) adjusted to provide a 1.0 mil coating thickness at a starting line speed of 400 feet per minute (ft/min). Melt temperature was about 300° C. At this constant polymer output rate, the line speed was gradually increased. As line speed increased at the constant polymer output, the thickness of the coating decreased (at 800 ft/min to about 0.5 mil and at 1600 ft/min to about 0.25 mil). Line speed was increased to the maximum speed (minimum thickness) that polymer properties would allow before edge tear. This maximum stable draw rate before edge tear measured is reported in the tables as "Draw, ft./min. (max.)."

Neck-in

Neck-in is the difference in the melt web width when it contacts the quench roll compared to the width as it exits the die. The values shown were taken at 800 ft/min (0.5 mil) under the conditions described above for measuring maximum stable draw rate.

EXAMPLES

The following Examples (Tables 1–6) show various aspects of this invention.

As can be seen from Example 1 versus Comparative Example C1 and Example 3 versus Comparative Example C3, greatly reduced "neck-in" occurs in extrusion coating while still maintaining adequate draw rates for most extrusion coating processes. This is very useful for minimizing edge bead and reducing edge trim waste.

This improved neck-in is a result of the same polymer chain entanglement that increases melt swell. Consequently the rest of the Examples in Tables 1, 2, 3 & 4 show the polymer changes only in terms of the change in melt swell.

The "Resulting MI" data in Tables 5 and 6 shows the effect on crosslinking low density polyethylene and linear low density polyethylene that sodium acrylate produced in situ has compared to the lack of an effect that acrylic acid has. The Resulting MI is significantly decreased as a result of the crosslinking.

Examples C1, 1, C2, 2 and 3

During synthesis of ethylene/methacrylic and ethylene/acrylic acid copolymers, an aqueous (50%) solution of sodium hydroxide was injected into the monomer/polymer stream after the first of two stages of monomer/polymer separation, thus partially neutralizing the acid groups of the polymer. In this process, unreacted acid monomer is still present at approximately 0.2 to 0.8% resulting in the formation of sodium methacrylate or sodium acrylate as well as the ionomer. Synthesis conditions of polymer prior to in-line neutralization are such that without the in situ salt formation melt swell would have been essentially equivalent.

TABLE 1

| | Wt. % acid in Polymer | | MI g/10 | Sodium | | Melt Swell | Extrusion Coating | |
|---|---|---|---|---|---|---|---|---|
| Ex. | MAA | AA | min | wt. % | % Neut. | % | Draw ft./min. (max.) | Neck-In inches |
| C1 | 10 | — | 1.44 | 1.47 | 55 | 45 | >2000 | 2 |
| 1 | — | 8.7 | 1.48 | 1.44 | 52 | 95 | 1000 | 0.5 |
| C2 | 20 | — | 0.9 | 2.51 | 47 | 22 | | |
| 2 | — | 19.9 | 1.2 | 1.96 | 31 | 75 | | |
| 3 | — | 11.2 | 3.1 | 1.10 | 31 | 82 | 1900 | 3 |

Examples C3, C4, 4, C5, 5 and 6

In Table 2 examples, ionomers were produced in an extrusion process by injecting sodium hydroxide solution into the melt to partially neutralize the acid. In this process there are less than 0.05 wt. % acid monomers present before neutralization. The small differences in melt swell could be inherent in the base polymer or due to the very small amount of sodium acrylate salt formed. The ion extrusion process is described in examples 35–42 and 48–57 of U.S. Pat. No. 3,404,134, which is incorporated herein by reference.

TABLE 2

| | Wt. % acid in Polymer | | MI g/10 | Sodium | | | Extrusion Coating | | |
|---|---|---|---|---|---|---|---|---|---|
| Ex. | MAA | AA | min | wt. % | % Neut. | Melt Swell % | Draw ft./min. (max.) | Neck-In inches |
| C3 | 15 | — | 2.8 | 1.16 | 29 | 43 | >2500 | 7 |
| C4 | 8.3 | — | 1.5 | 0.84 | 38 | 54 | | |
| 4 | — | 8.3 | 1.3 | 0.85 | 32 | 58 | | |
| C5 | 15 | — | 0.92 | 2.06 | 38 | 32 | | |
| 5 | — | 12.5 | 1.01 | 2.02 | 32 | 41 | | |
| 6 | — | 20.1 | 1.28 | 2.37 | 37 | 43 | | |

Examples C6, 7, C7, C8, 8 and C9

Table 3 shows a series of studies where sodium ionomers were produced in a 30 mm twin screw extruder by reacting sodium carbonate with the polymer acid. Acid monomers were added to the melt by injecting 2 ml of water/monomer solution. The sodium carbonate was added via a concentrate along with the acid copolymer to the extruder feed. These data show the large affect on the melt swell of the E/AA and the E/MAA ionomers when sodium acrylate is formed in situ but not when the sodium methacrylate is formed in situ.

TABLE 3

| | Wt. % acid in Polymer | | MI g/10 | Sodium | | Mon- omer | Wt. % Mon- omer | Melt Swell |
|---|---|---|---|---|---|---|---|---|
| Ex. | MAA | AA | min | wt. % | % Neut. | Added | Added | % |
| C6 | — | 9 | 1.0 | 0.98 | 34 | None | — | 32 |
| 7 | — | 9 | 0.62 | 0.98 | 34 | AA | 0.45 | 100 |

TABLE 3-continued

| | Wt. % acid in Polymer | | MI g/10 | Sodium | | Mon- omer | Wt. % Mon- omer | Melt Swell |
|---|---|---|---|---|---|---|---|---|
| Ex. | MAA | AA | min | wt. % | % Neut. | Added | Added | % |
| C7 | — | 9 | 0.67 | 1.06 | 37 | MAA | 0.44 | 42 |
| C8 | 10 | — | 2.3 | 1.02 | 38 | None | — | 23 |
| 8 | 10 | — | 2.0 | 1.02 | 38 | AA | 0.45 | 86 |
| C9 | 10 | — | 2.7 | 1.02 | 38 | MAA | 0.44 | 22 |

Examples C10, 9, C11 and 10

Table 4 is similar to Table 3 except a zinc ionomer was produced in the twin screw extruder by reacting zinc oxide. Again as with sodium in Example 3, the in situ formation of zinc acrylate resulted in high melt swell.

TABLE 4

| | Wt. % acid in Polymer | | MI g/10 | Zinc | | Monomer | Wt. % Monomer | Melt Swell |
|---|---|---|---|---|---|---|---|---|
| Ex. | MAA | AA | min | wt. % | % Neut. | Added | Added | % |
| C10 | — | 9 | 0.53 | 1.64 | 40 | None | — | 27 |
| 9 | — | 9 | 0.27 | 1.64 | 40 | AA | 0.48 | 54 |
| C11 | 10 | — | 2.83 | 1.52 | 40 | None | — | 14 |
| 10 | 10 | — | 1.42 | 1.52 | 40 | AA | 0.53 | 70 |

Examples C12, 11, and C13

Table 5 shows that the crosslinking does not require polymeric acid or an ionomer. Experiments performed in a HAAKE batch mixer show that the metal acrylate salt and not the acrylic acid itself bring about crosslinking (Resulting MI is reduced in Example 11 where crosslinking occurred). The polyethylene used in Example C12 and 11 was a free radical produced polyethylene homopolymer of 0.922 g/cc density.

TABLE 5

| Ex. | Polymer | MI g/10 min | Monomer Added | Wt. % Monomer Added | HAAKE Temp ° C. | HAAKE Time, min. | Resulting MI |
|---|---|---|---|---|---|---|---|
| C12 | LDPE | 1.8 | AA | 5 | 250 | 20 | 1.4 |
| 11 | LDPE | 1.8 | Sodium Acrylate* | 5 | 200 | 10 | 0.1 |
| C13 | 9% MAA | 1.5 | AA | 5 | 200 | 10 | 1.3 |

*Formed in situ by adding aqueous sodium hydroxide stoichiometrically to LDPE containing 5 wt. % acrylic acid monomer.

Examples C14 and 14

Table 6 shows similar data to Table 5 for Exact®4011, a linear low density polyethlene having an MI of 2.0 grams/10 minutes and a density of 0.89 grams/cubic centimeter made using a metallocene catalyst by Exxon.

TABLE 6

| Ex. | Polymer | MI g/10 min | Monomer Added | Wt. % Monomer Added | Roll Mill Temp ° C. | Roll Mill Time, min. | Resulting MI |
|---|---|---|---|---|---|---|---|
| C14 | LLDPE | 1.9 | AA | 0.42 | 190 | 10 | 2 |
| 14 | LLDPE | 1.9 | Sodium Acrylate* | 0.55 | 190 | 10 | 0.07 |

*Formed in situ by adding stoichiometrically aqueous sodium hydroxide to the LLDPE on a roll mill which had 0.42% AA monomer previously incorporated in an extruder.

What is claimed is:

1. A process for covalently crosslinking an alpha olefin polymer consisting essentially of melt blending sufficient acrylic acid with the alpha olefin polymer and then adding a sufficient amount of a non-acrylate metal ion source to convert the acrylic acid into about 0.05 parts to about 10 parts by weight of a metal salt of acrylic acid per 100 parts by weight of the alpha olefin polymer.

2. The process of claim 1 wherein the resulting metal salt of acrylic acid melt per 100 parts by weight of alpha olefin polymer is about 0.1 parts to about 2 parts by weight.

3. The process of claim 2 wherein the resulting unsaturated metal salt of acrylic acid melt per 100 parts of the alpha olefin polymer is about 0.2 parts to about 0.8 parts by weight.

4. The process of claims 1, 2, or 3 wherein the metal acrylate is a sodium or zinc salt of acrylic acid.

5. The process of claim 1 wherein the alpha olefin polymer is polyethylene, an ethylene (meth)acrylate copolymer, an ethylene acetate copolymer, an ethylene/$C_{3-8}$ $\alpha,\beta$ ethylenically unsaturated carboxylic acid copolymer, or an ethylene/$C_{3-8}$ $\alpha,\beta$ ethylenically unsaturated carboxylic acid copolymer partially neutralized by an alkali metal or an alkaline earth metal cation.

6. The process of claim 4 wherein the alpha olefin polymer is polyethylene, an ethylene (meth)acrylate copolymer, an ethylene acetate copolymer, an ethylene/$C_{3-8}$ $\alpha/\beta$ ethylenically unsaturated carboxylic acid copolymer, or an ethylene/$C_{3-8}$ $\alpha/\beta$ ethylenically unsaturated carboxylic acid copolymer partially neutralized by an alkali metal or an alkaline earth metal cation.

7. A process for covalently crosslinking an ethylene/$C_{3-8}$ $\alpha/\beta$ ethylenically unsaturated carboxylic acid copolymer or an ethylene/$C_{3-8}$ $\alpha/\beta$ ethylenically unsaturated carboxylic acid copolymer partially neutralized by an alkali metal or an alkaline earth metal cation consisting essentially of melt blending about 0.05 parts to about 10 parts by weight of a metal salt of acrylic acid with per 100 parts by weight of the copolymer.

8. The process of claim 7 wherein the ethylene/$C_{3-8}$ $\alpha/\beta$ ethylenically unsaturated carboxylic acid is an ethylene methacrylic acid copolymer or an ethylene acrylic acid copolymer.

9. The process of claim 7 or 8 wherein about 0.1 to about 2.0 parts by weight of the metal salt of acrylic acid per 100 parts by weight of copolymer is melt blended with the copolymer.

10. The process of claim 9 wherein about 0.2 to about 0.8 parts by weight of the metal salt of acrylic acid per 100 parts by weight of copolymer is melt blended with the copolymer.

11. The process of claim 7 or 9 wherein the metal salt of the acrylic acid is a sodium or zinc salt.

* * * * *